(12) United States Patent
Sarajisto et al.

(10) Patent No.: US 10,117,149 B2
(45) Date of Patent: Oct. 30, 2018

(54) OBTAINING OF COMMUNICATION SERVICE

(71) Applicant: Telia Company AB, Solna (SE)

(72) Inventors: Tomi Sarajisto, Helsinki (FI); Jukka Hanninen, Espoo (FI); Teemu Turu, Helsinki (FI); Markku Heiskanen, Espoo (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 15/611,549

(22) Filed: Jun. 1, 2017

(65) Prior Publication Data

US 2017/0353899 A1 Dec. 7, 2017

(30) Foreign Application Priority Data

Jun. 1, 2016 (FI) ...................................... 20165456

(51) Int. Cl.
| | |
|---|---|
| *H04W 36/14* | (2009.01) |
| *H04W 24/08* | (2009.01) |
| *H04W 8/18* | (2009.01) |

(52) U.S. Cl.
CPC ........... *H04W 36/14* (2013.01); *H04W 8/183* (2013.01); *H04W 24/08* (2013.01)

(58) Field of Classification Search
CPC ...... H04W 88/06; H04W 12/06; H04W 48/18
See application file for complete search history.

(56) References Cited

U.S. PATENT DOCUMENTS

| | | | | |
|---|---|---|---|---|
| 9,491,693 | B1* | 11/2016 | Chuttani | H04W 48/16 |
| 9,712,973 | B2* | 7/2017 | Shih | H04W 4/025 |
| 9,712,994 | B2* | 7/2017 | Tagg | H04W 8/183 |
| 9,735,821 | B2* | 8/2017 | Vecera | H04B 1/3816 |
| 9,769,641 | B2* | 9/2017 | Kaikkonen | H04M 15/8351 |

(Continued)

FOREIGN PATENT DOCUMENTS

| | | |
|---|---|---|
| EP | 0 579 655 A1 | 1/1994 |
| EP | 2448301 A1 | 5/2012 |

(Continued)

OTHER PUBLICATIONS

FI Search Report, dated Nov. 29, 2016, from corresponding FI application.

(Continued)

*Primary Examiner* — Dung Hong
(74) *Attorney, Agent, or Firm* — Young & Thompson (57) ABSTRACT

Disclosed is a method for obtaining a communication service for a mobile terminal, the method including: monitoring at least one parameter representing an operational state of at least one service provided by a first communication network into which the mobile terminal is registered to with a first subscriber identity; in response to a detection that the at least one parameter does not fulfill at least one predetermined condition generating a signal to cause the mobile terminal to switch the first subscriber identity to a second subscriber identity, wherein the second subscriber identity allows the mobile terminal to register to a second communication network as a roaming subscriber. The invention also relates to a mobile terminal, a network node and a computer program product.

13 Claims, 3 Drawing Sheets

(56) References Cited

U.S. PATENT DOCUMENTS

| | | | | |
|---|---|---|---|---|
| 2011/0269503 A1* | 11/2011 | Park | ...................... | H04W 8/183 |
| | | | | 455/552.1 |
| 2012/0052911 A1 | 3/2012 | Chin et al. | | |
| 2014/0120859 A1* | 5/2014 | Ekici | ........................ | H04W 4/90 |
| | | | | 455/404.1 |
| 2014/0274006 A1* | 9/2014 | Mutya | ................... | H04W 36/14 |
| | | | | 455/416 |
| 2015/0334761 A1* | 11/2015 | Liao | ...................... | H04W 76/16 |
| | | | | 455/552.1 |
| 2016/0374014 A1* | 12/2016 | Anyuru | ............... | H04L 63/0853 |
| 2018/0014239 A1* | 1/2018 | Chau | ..................... | H04W 88/06 |

FOREIGN PATENT DOCUMENTS

| | | |
|---|---|---|
| EP | 2490492 A1 | 8/2012 |
| EP | 2 627 033 A1 | 8/2013 |
| EP | 2 874 420 A1 | 5/2015 |
| EP | 2955947 A1 | 12/2015 |
| WO | 2008011550 A1 | 1/2008 |

OTHER PUBLICATIONS

Oct. 13, 2017, EP communication issued for related EP application No. 17173660.

\* cited by examiner

000
OBTAINING OF COMMUNICATION SERVICE

TECHNICAL FIELD

The invention concerns in general the technical field of mobile communications. More particularly, the invention concerns obtaining of communication service for a mobile terminal.

BACKGROUND

Mobile communication terminals, also known as mobile terminals, have nowadays multiple communication channels either established with different communication technologies or with different communication applications. When a user is willing to initiate a communication with a destination party he/she selects an application and the destination party and performs predetermined actions in order to initiate the communication towards the destination party. The communication channel, i.e. the technology and the application, varies according to the user selection, e.g. the selection of the application used for the initiation of the communication. For example, in case the user selects a call application in the user terminal the call may be setup through a mobile communication network and the connection utilizes a communication technology implemented in the mobile communication network.

However, the availability of multiple communication applications and communication channels has tremendously increased a complexity of the communication environment. For example, it may happen that there is a failure in a communication channel and the mobile terminal is blocked to use the communication channel in question, but the user is still selecting an application using the communication channel for initiating the communication. As a result, the user gets frustrated as the connection cannot be established.

The existing solutions provide some arrangements which enable the user to detect that a certain communication channel is not available for communication. Namely, the mobile terminals equipped with a subscriber identity module for accessing a mobile telecommunication network controlled by a telecom operator are configured to monitor a quality of the mobile communication network. The monitoring is implemented by arranging the mobile terminal to measure radio signal strength and, if possible, to switch the mobile terminal to another cell in case the signal strength is below a limit. In some situation it may turn out that none of the cells capable of serving the mobile terminal in question are able to provide acceptable signal strength and as a result the mobile terminal is out-of-service from the mobile communication network. The mobile terminal is typically configured to indicate this to the user e.g. by showing a dedicated indicator on a display.

Further, there is also introduced a solution that switches a subscriber identity in the network in case the above described situation regarding a weak signal strength with one subscriber identity is detected. Namely, a subscriber identity module may store a plurality of subscriber identities, such as IMSI (International Mobile Subscriber Identity), and a logic switching between the subscriber identities in response to a detection of un-acceptable signal strength with the subscriber identity in use. The subscriber identities differ so that the second subscriber identity represents a foreign subscriber identity to the network into which the first subscriber identity is tied to. In case the second subscriber identity is activated the mobile terminal initiates a registering procedure towards a home network of the second subscriber identity through available networks within the area the mobile terminal resides.

The known solutions have drawbacks at least in that they provide very simple process for transferring the subscriber to use a foreign subscriber identity only if the signal strength goes below a predetermined threshold level. However, the known solution does not reveal a situation if a certain communication service is not available at all even if the signal strength is maintained above the threshold level.

Hence, there is need to develop a solution by means of which it is possible to mitigate, at least partly, the drawbacks of the existing solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method, a mobile terminal, a network node and a computer program product for obtaining a communication service for a mobile terminal. Another objective of the invention is that the method, the mobile terminal, the network node and the computer program product for obtaining a communication service for a mobile terminal improves a reachability of a user in a specific network situation.

The objectives of the invention are reached by a method, a mobile terminal, a network node and a computer program product as defined by the respective independent claims.

According to a first aspect, a method for obtaining a communication service for a mobile terminal is provided, wherein the method comprises: monitoring at least one parameter representing an operational state of at least one service provided by a first communication network into which the mobile terminal is registered to with a first subscriber identity; in response to a detection that the at least one parameter does not fulfill at least one predetermined condition generating a signal to cause the mobile terminal to switch the first subscriber identity to a second subscriber identity, wherein the second subscriber identity allows the mobile terminal to register to a second communication network as a roaming subscriber.

The monitoring and the detection may be performed by the mobile terminal by receiving a message from a network node collecting information on the operational state of the first communication network and by detecting, based on information carried in the message, if the at least one predetermined condition is fulfilled or not. The monitoring and the detection may further comprise detection if the message is received under a predetermined schedule in the mobile terminal.

The switch may be performed by the mobile terminal in response to a detection that a message cannot be delivered to the first communication network by the mobile terminal.

Moreover, the method may further comprise delaying the generation of the signal for a period of time and performing the monitoring and detection during the period of time.

Also, the method may further comprise switching the second subscriber identity to the first subscriber identity in response to an indication that at least one parameter representing an operational state of at least one service in the first communication network fulfills the at least one predetermined condition. The indication may be received from at least one of the following: a network node maintaining information on the switched subscriber identities, from an analysis of received information by the mobile terminal.

According to a second aspect, a mobile terminal for obtaining a communication service is provided, wherein the mobile terminal comprises: at least one processor; at least one memory including computer program code; wherein the at least one memory and the computer program code configured to, with the at least one processor, cause the mobile terminal to perform: monitor at least one parameter representing an operational state of at least one service provided by a first communication network into which the mobile terminal is registered to with a first subscriber identity; in response to a detection that the at least one parameter does not fulfill at least one predetermined condition generate a signal to cause a switch of the first subscriber identity to a second subscriber identity, wherein the second subscriber identity allows the mobile terminal to register to a second communication network as a roaming subscriber.

The monitoring and the detection may be performed by the mobile terminal by receiving a message from a network node collecting information on the operational state of the first communication network and by detecting, based on information carried in the message, if the at least one predetermined condition is fulfilled or not. The mobile terminal may further be configured to detect if the message is received under a predetermined schedule in the mobile terminal.

The switch may be performed by the mobile terminal in response to a detection that a message cannot be delivered to the first communication network by the mobile terminal.

The mobile terminal may further be configured to delay the generation of the signal for a period of time and performing the monitoring and detection during the period of time.

The mobile terminal may further be configured to: switch the second subscriber identity to the first subscriber identity in response to an indication that at least one parameter representing an operational state of at least one service in the first communication network fulfills the at least one predetermined condition.

The mobile terminal may be configured to derive the indication on a basis of at least one of the following: information received from network node maintaining information on the switched subscriber identities, based on an analysis of received information by the mobile terminal.

According to a third aspect, a network node is provided, wherein the network node comprises: at least one processor; at least one memory including computer program code; wherein the at least one memory and the computer program code configured to, with the at least one processor, cause the network node to perform: monitor at least one parameter representing an operational state of at least one service provided by at least one communication network; maintain information on one or more switched subscriber identities; and in response to a detection that the at least one parameter fulfills at least one predetermined condition set for a first communication network from which at least one subscriber identity is switched to another subscriber identity generate a signal comprising information for indicating that the first subscriber identity may be returned in order to cause the mobile terminal to register back to the first communication network.

According to a fourth aspect, a computer program product comprising at least one computer-readable storage medium having computer-executable program code instructions stored therein is provided for performing the method as described above when the computer program product is executed on a computer.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an environment in which the present invention may be implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
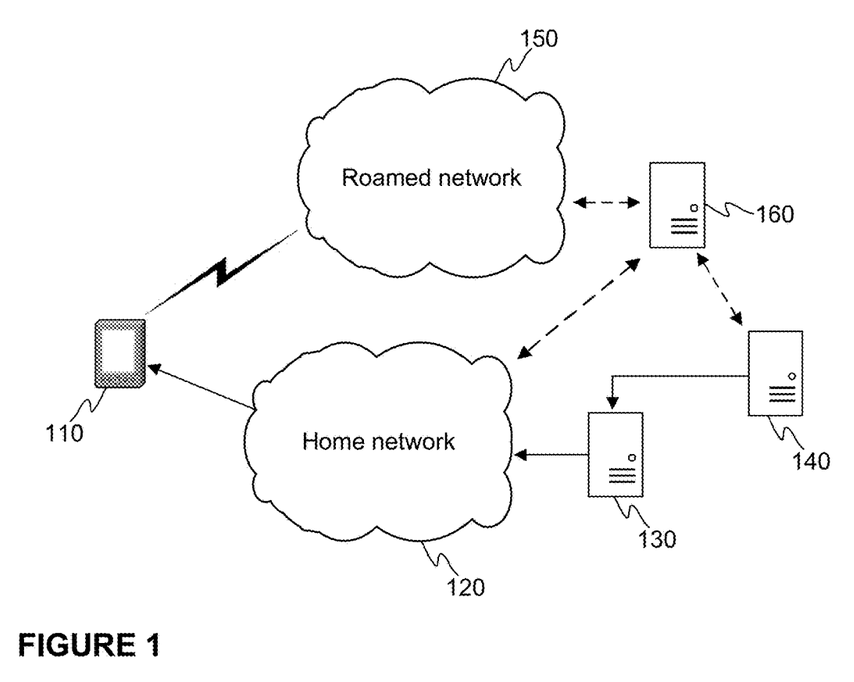

FIG. 1 illustrates schematically an environment in which the present invention may be implemented to. A mobile terminal 110 resides in a service area of at least home network 120 and a second network 150. The mobile terminal 110 is equipped with a subscriber identity module (not disclosed in FIG. 1) comprising a plurality of mobile subscriber identities, such as IMSIs (International Mobile Subscriber Identity). IMSI is an identity for a user of a mobile communication network that is a unique for the user. Moreover, an applet may be configured for controlling a selection of the subscriber identity from the subscriber identity module. The applet may e.g. be stored in and executed from a subscriber identity module, or a memory of a mobile terminal 110. In this example of the invention the subscriber identity module stores two IMSIs which are selectable by the applet. The first IMSI is an identity for the home network 120 and the second IMSI is an identity for another network which does not provide network services in the area, but has a roaming agreement with another network operator providing network services through a second network 150 within an area at least partly overlapping with the area of the home network 120 i.e. the another network, i.e. the second network 150, is not a home network for the second IMSI. An example of the other network is a network residing in a foreign country and is operated with a foreign telecom operator. As the registration and communication to a network requires security keys it is possible to arrange so that there are the same keys for both networks 120, 150 or dedicated keys for each network 120, 150. Further, one aim of the invention is to provide desired service to the mobile terminal 110 at least partly through a network 150 if the home network 120 cannot provide the service. The determination if the home network 120 cannot provide the service may e.g. be performed by monitoring e.g. through collecting information at least on a state of at least one network service in a network node 130 and by transmitting the collected information to the mobile terminal 110 for analysis. The transmit of information may be performed in any available manner, such as with short message service or through a data channel. Alternatively or in addition, the network node 130 may be configured to analyze, at least partly, the information received e.g. from a network node 140, or a system, being aware of network state and/or state of one or more network nodes, and to transmit an indication on a result of the analysis to the mobile terminal. The network node may also be configured to select such a communication channel that is available for use to reach the mobile terminal 110 through the home network 120. The receipt of the information from the network node 130 may initiate an application residing in the mobile terminal or in the subscriber identity module. The application may be configured to analyze the received information and to determine if the information indicates that the home network 120 cannot provide a requested service. If such an indication is found the application may be configured to generate a control signal to switch the subscriber identity to another one stored in the subscriber identity module. Alternatively, the application may receive the indication on the result of the analysis in the network node 130 and in response to that to generate a control signal to switch the subscriber identity to another one stored in the subscriber identity module. Prior to initiate the switch of the subscriber identity the application may be configured to generate a notification to the user of the mobile terminal 110 and, possibly, request acceptance to the IMSI switch from the user through an interaction with a I/O device of the mobile terminal 110.

Now, the switch of the IMSI may cause the mobile terminal 110 to re-start and as a result the subscriber represented with the second IMSI starts registration. The registration process is typical for the network technology used comprising for example RRC connection establishment through attaching in which the IMSI is delivered and authentication related operations in which security keys dedicated to the IMSI are delivered, as is the case e.g. in LTE network. As a result of the registration process the mobile terminal 110 is switched to use services provided by the second network 150 as a roaming subscriber as the second IMSI belongs to a third network operator not offering an own network access within the area. For sake of clarity, when the mobile terminal is restarted and the new IMSI is taken into use the mobile terminal 110 starts selecting a network into which it aims to register according to preferred operator list stored in the subscriber identity module. The preferred operator list is linked to the corresponding IMSI stored in the subscriber identity module. Hence, at some point the mobile terminal 110 finds the second network 150 from the preferred operator list and starts the registration process, as described above, to there. Worthwhile to mention is that as the second network 150 is not the home network of the second IMSI the mobile terminal 110 registers as a roaming subscriber to the second network 150. The preferred operator list may be defined by the network operator whose IMSI is taken into use. The list may be defined according to predetermined criteria. For example, mutual agreements, such as roaming agreements, may impact on the order of the preferred operators in the list.

Now, the second network 150 receives the registration request that carries information on the second IMSI and a network management node, such as a mobile switching center, detects from IMSI that it shall perform some authentication procedures towards the home network of the IMSI in question with the security keys received in the registration request. In other words, an inquiry shall be made to a home location register of the home network 120, which in this case is made through the roamed network towards the home location register of the home network for the second IMSI, i.e. the foreign network. Depending on the network technology used the home network of the second IMSI may return so called authentication vectors e.g. in case of 3G or LTE to the mobile terminal that generates necessary session keys and authentication tags with the security keys and the authentication vectors and in case the authentication procedure is successful the mobile terminal 110 may start using services of the second network 150, i.e. roamed network. As a result the user of the mobile terminal is again reachable.

In some implementations a successful registration to the second network may initiate a delivery of message, comprising e.g. indication that the mobile terminal has switched the subscriber identifier of the first network to the subscriber identity for enabling utilization of services of the second network as a roaming subscriber. The message, or signaling, may e.g. comprise a predefined destination address and carry information on the switched subscriber identities, such as both subscriber identities and an indication that a switch is made. Additionally, the information may e.g. comprise a reason why the switching is made. The destination address may e.g. direct to a network node, such as a node 160 in FIG. 1 (will be described in more detail later), that is configured to maintain the information on the switch. The information stored in the network node may be used if and when the subscriber identity for the home network is returned.

A further example of the monitoring 210 if the one or more network services used and/or usable by the mobile terminal 110 in the home network 120 may be arranged so that the mobile terminal 110 is configured to monitor an availability of network services and in response to a detection that the mobile terminal 110 does not receive one or more services in a predetermined level a clock is started in the mobile terminal 110. The clock may e.g. be hardware or software implementation and a value is set to the clock. If the mobile terminal 110 does not receive the service before the clock reaches the value, an application at least partly monitoring the service situation experienced by the mobile terminal 110 may conclude that the subscriber identity switch is needed in order to provide the user a communication service. In other words, by the implementation of the clock it is possible to delay the switching of subscriber identities for a period of time defined by the value and in that manner to prevent, at least partly, unnecessary switching e.g. due to a temporal malfunctioning of the first network.

Now as the mobile terminal 110 is registered to use services of the second network with the second IMSI it may be desirable to return to be served with the first network 120 when the predetermined level of service quality is again available in the first network 120. This may refer to a situation in which any malfunction, or a maintenance work, in the first network that caused the reduced service quality is repaired and the first network 120 operates normally. In order to monitor the state of the first network a further network node 160 may be implemented in a network environment, which further network node 160 may be communicatively coupled with first network 120 and the second network 150 and any further network. The further network node 160 may e.g. be a common network element for a plurality of telecom operators and the functionality of the further network node may be implemented so that it is configured to obtain and maintain state information on a plurality of networks. The further network node 160 may be communicatively coupled to e.g. operations and maintenance centres of the plurality of networks in order to obtain the necessary information and/or any network node capable of providing the information to the further network node 160. For example, such a network node may e.g. be the node 140 in FIG. 1, which may be even considered as an operations and management centre for the first network 120 in some embodiment of the invention. The arrows drawn with dash lines represent the communicative coupling of the networks and/or network nodes to obtaining the necessary information in the further network node 160. In this kind of setup the first network 120 when operating again normally may send an update message to the further network node 160, which message may indicate either directly or indirectly that the first network is again operating normally. Alternatively or in addition, the further network node 160 may be provided with an access to monitor some operational parameters, such as signaling, in the networks and when it detects that the monitored parameter is normal, e.g. compared to some predefined values, it may setup in its data structure that the network in question, such as the first network 120 is again in a normal mode.

Another aspect with regard to the further network node may be that it is configured to maintain information on subscriber identities, e.g. IMSIs, that are assigned to a user i.e. residing in the subscriber identity card of the mobile terminal 110. In other words, the further network node shall maintain information that links the first and the second IMSI together. Additionally, the further network node 160 may be configured to receive information from the first and the second network, and/or from any further network, which IMSIs are registered in each of the networks. Based on the information the further network node 160 may be configured to, when obtaining the indication that a certain network is again operating normally, to go through the IMSIs and to find an IMSI that is dedicated to the network that is again operating normally, i.e. the first network 120 in the description of the present invention. Moreover, the further network node 160 may be configured to retrieve information of the second IMSI registered in the second network 150 and to compose a signal, i.e. a message, to the mobile terminal 110 in which the second IMSI is in use and to indicate, to e.g. an application operated by the mobile terminal, that the first network 120, i.e. the home network for the first IMSI, is again operating normally. The indication received from the further network node 160 may be configured to cause the mobile terminal, i.e. the application, to cause a switch of the IMSI back to the IMSI allowing the mobile terminal to register back to the first network 120. This may require a restart of the mobile terminal 110 in order to activate the first IMSI for registration to the first network 120. In the described non-limiting manner the mobile terminal may be returned to be served by the home network 120.

Figure 2:
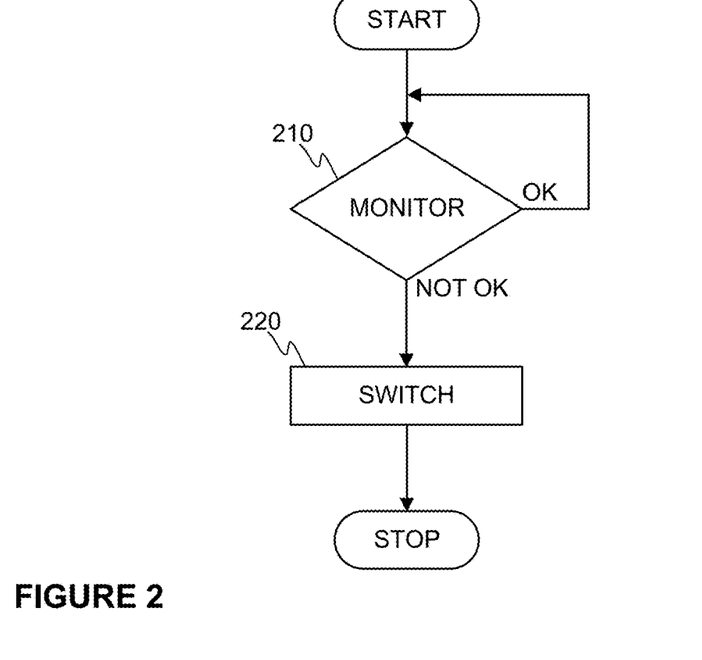
FIG. 2 illustrates schematically a method according to an example of the present invention.

FIG. 2 schematically illustrates a method according to an example of the present invention wherein a mobile terminal 110 is served by a home network 120 through a subscriber identity, i.e. first IMSI, of the home network 120. According to the method as depicted in FIG. 2 it is monitored 210 one or more network services used by the mobile terminal 110 in the home network 120 in at least one manner. For example, the monitored services may be, but are not limited to, a call service, a short message service and a data service provided to the mobile terminal 110 by the network. The monitoring of the call service may refer, but is not limited to, to a monitoring of one or more quality parameters representing successful calls in the home network, for example. The monitoring of short message service may refer, but is not limited to, to monitoring of one or more quality parameters representing successfully delivered short messages through one or more short message centers residing in the home network 120. The monitoring of the data service may refer, but is not limited to, to a monitoring if the mobile terminal has a data access provided by the home network 120. In some further embodiment of the invention the monitoring 210 may be implemented so that a network node performing a task relating to a service provided by the home network is configured to communicate with the mobile terminal 110 in a predetermined manner which communication indicates, either directly or indirectly, state information relating to at least one network service used by the mobile terminal 110 that is provided by the home network 120. For example, it may be arranged so that a network node of the home network is configured to transmit a predetermined message, such as a short message or an ussd message, to the mobile terminal 110 wherein the message comprises one or more pieces of information based on which it is possible to detect if the first network is operating as expected, i.e the at least one parameter fulfills the at least one predetermined condition. The message may also be transmitted under a predetermined schedule to the mobile terminal 110. The predetermined schedule may be known by the mobile terminal, i.e. an application residing in the mobile terminal performing at least some operations according to some embodiment of the present invention, wherein the predetermined schedule may be defined in a memory of the mobile terminal from which the schedule is read or the piece of information is transmitted in at least some of the messages, e.g. in such a manner that each transmitted message comprise a data record indicating when the next message is to be expected. If it is detected, through the monitoring 210, that such a predetermined message is not received in the mobile terminal 110 from the network node according to the schedule, the mobile terminal 110 may conclude that the mobile terminal 110 does not experience a service with a desired quality from the first network. The same may also be arranged so that the mobile terminal 110 is configured to transmit a message in response to each received message, or even according to a predetermined schedule as a monitoring operation. If it is detected in the mobile terminal 110, e.g. by an application, that the message cannot be delivered from the mobile terminal 110 to the first communication network, it may be concluded that the mobile terminal 110 does not experience a service with a desired quality from the first network. The detection that the message cannot be delivered may e.g. be done based on delivery acknowledgement received from the network or absence of it.

Concluding some aspects disclosed above in the monitoring step 210 it may be detected, under one or more specific conditions, if the home network provides one or more network service with a predetermined quality to the mobile terminal 110 or not. The detection itself may be performed in the mobile terminal 110 or in at least one network node or in a combination of these two. In case the detection is arranged to be performed in the network side, the network node(s) being involved in the detection are configured to generate and transmit a predetermined signal through at least one communication channel to the mobile terminal which signal, either directly or indirectly, indicates, at least, that the service quality the mobile terminal receives from the network. In case the service quality does not fulfill predetermined requirements, that are conditions, the mobile terminal 110 is configured to initiate a switch of the subscriber identity, as will be discussed below.

As discussed above at some instant of time it may be concluded, by the mobile terminal or a network node, that the subscriber identity being active in the mobile terminal 110 shall be switched to another subscriber identity defined in the subscriber identity module residing in the mobile terminal. The switching may be arranged so that an application residing in the mobile terminal 110 is configured to, in response to a receipt of information on the degradation in the service quality either directly or indirectly as described, generate a control signal for switching the first subscriber identity to the second subscriber identity. The switching may cause the mobile terminal to re-start and to register to a home network of the second subscriber identity, IMSI2, and start utilizing network services of the second network as a roaming subscriber, as already described.

Figure 3:
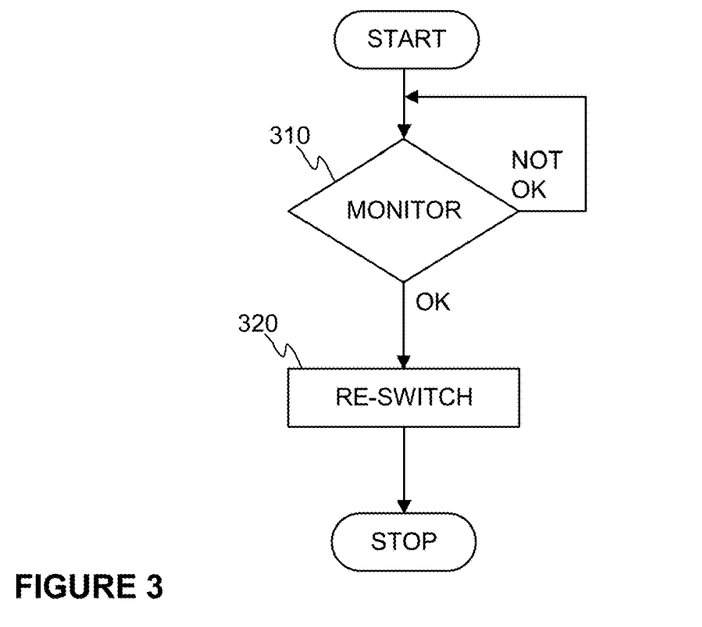
FIG. 3 illustrates schematically a method according to an embodiment of the invention from a network node point of view.

FIG. 3 illustrates schematically some aspects of the operation of the further network node 160 wherein the further network node 160 is configured to monitor 310 an operational state of at least one service provided by a first network 120, that is the network from which the mobile terminal 110 is moved through the switching of the IMSI to a second network 150. Additionally, the monitoring may be performed to the other networks than the first network 120. The monitoring may be performed by regularly analyzing at least one parameter obtained representing an operational state of the first network or by receiving state information representing the operational state of the first network, for example. In case the operation of the first network is not ok, the monitoring is continued. On the other hand, if the monitoring indicates that the first network 120 operates within at least one predetermined condition, i.e. normally, the further network node 160 is configured to indicate that the mobile terminal shall re-switch 320 the IMSI in order to return to the first network 120. The indication may e.g. be an instruction signal delivered from the further network node 160 to the mobile terminal 110 or a delivery of the information received from the first network, which information may be utilized either directly or indirectly by the mobile terminal 110. As discussed earlier the further network node 160 may be configured to maintain information on the first and the second network identities, i.e. IMSI, in such a way that it is at least possible to derive which identities are linked to each other. In such a manner, as the further network node 160 is aware of the home networks of each of the IMSIs and any roaming arrangements, the further network node 160 may derive the indication to the mobile terminal 110 in response to a receipt of information that indicates the first network 120 to operate normally.

Figure 4:
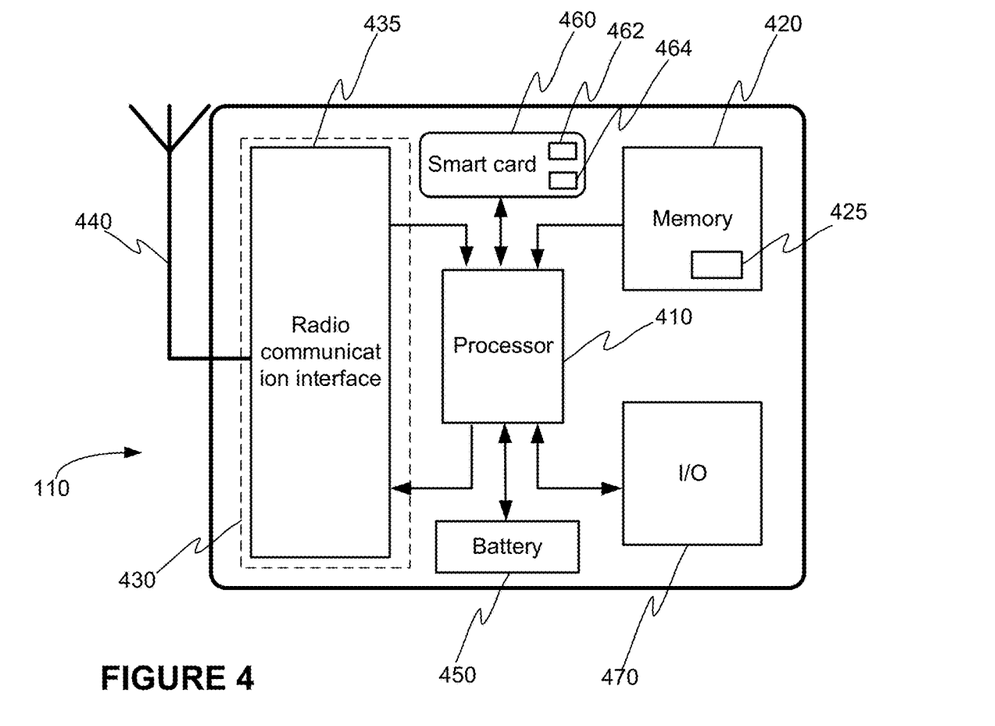
FIG. 4 illustrates schematically a mobile terminal according to an example of the present invention.

FIG. 4 illustrates schematically, as a block diagram, some components of a mobile terminal 110 being involved in an implementation of the present invention at least partly. The mobile terminal 110 may comprise further components or portions in addition to those shown in FIG. 4. For example, the mobile terminal 110 may comprise sensors configured to monitor one or more parameters having possible relation, or impact, to an operation of the mobile terminal 110.

The mobile terminal 110 of FIG. 4 comprises a processor 410 and a memory 420 for storing data and computer program code 425. The mobile terminal 110 may further comprise user I/O (input/output) components 470 that may be arranged, possibly together with the processor 410 and at least a portion of the computer program code 425, to provide a user interface (UI) for receiving input from a user of the mobile terminal 110 and/or providing output to the user of the mobile terminal 110. The user I/O components 470 may comprise hardware components such as a display, a touchscreen, a touchpad, a mouse, a keyboard, and/or an arrangement of one or more keys or buttons, etc. The processor 410 may be arranged to control operation of the primary monitoring device 110 e.g. in accordance with a portion of the computer program code 425 stored in the memory 420 and possibly further in accordance with the user input received via the user I/O components 480 and/or in accordance with information received via a communication portion 430 comprising at least one radio communication interface. The memory 420 and a portion of the computer program code 425 stored therein may be further arranged, with the processor 410, to provide a control portion or a control function for controlling operation of radio communication interfaces of the communication portion 430, possibly together with a control portion or a control function that may be provided within the radio communication interface of the communication portion 430. These control functions may be, separately or jointly, referred to as control means.

The references to the processor 410 of the mobile terminal 110 should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The communication portion 430, as already mentioned, comprises at least one radio communication interface 435 for wireless communication with a first network and a second network, which radio communication interface 435 may be employed to establish the wireless link that enables wireless connection to the respective network. The communication portion 430 may comprise one or more further communication apparatuses for wireless and/or wired communication with other devices. The radio communication interfaces comprise necessary devices and means for performing operations as described. For example, the radio communication interfaces may perform, e.g. under a control of the processor 410, operations implementing e.g. modem function towards corresponding network 120, 150, among other tasks. For the purpose of the communication the mobile terminal 110 may comprise one or more antennas 440 dedicated to the radio communication interfaces implemented in the mobile terminal 110.

The mobile terminal 110 may also comprise a battery 450 for providing energy for the operation of the device as described. Moreover, the mobile terminal 110 may comprise arrangements and devices to monitor an energy level of the battery for the purpose of some embodiment of the invention, as described earlier. The processor 410 may e.g. be responsible of obtaining a value from which it is possible to derive the energy level of the battery 450 and on that basis take further measures according to some embodiment of the present invention.

Furthermore, the mobile terminal 110 may be equipped with a smart card 460, such as a subscriber identity module, comprising at least two separate network identities 462, 464, such as IMSIs, which are switchable. The separate network identities 462, 464 are for different networks, as described earlier in the description. The switching between the network identities 462, 464 may be performed under control of the processor 410. This means that the processor 410 may be configured to execute a portion of a computer program code that causes the processor to analyze a need to switch between the network identities 462, 464, as described, and to generate an instruction, i.e. signal to switch the identities if that is the case. A more detailed description of the switching is given earlier in the description.

For sake of clarity although at least some of the components in the mobile device are illustrated as single components, any of the components may, however, be implemented as respective one or more separate components, some or all of which may be integrated/removable. Hence, the number of physical and operational components within each block may vary from the illustration.

Some aspects of the present invention may relate to a computer program product 425 stored in the memory 420 of the mobile terminal 110 wherein the computer program product comprises computer-executable instructions that control the operation of the respective mobile terminal 110 when loaded into the respective processor 410. As an example, the computer program 425 may include one or more sequences of one or more instructions. The computer program 425 may be provided as a computer program code. The processor 410 is able to load and execute the computer program 425 by reading the one or more sequences of one or more instructions included therein from the memory 420. The one or more sequences of one or more instructions may be configured to, when executed by the processor 410, cause the mobile terminal 110 to carry out operations, procedures and/or functions described in the foregoing. Hence, the mobile terminal 110 may comprise at least one processor 410 and at least one memory 420 including computer program code for one or more programs, the at least one memory 420 and the computer program code configured to, with the at least one processor 410, cause the mobile terminal 110 to perform operations, procedures and/or functions described in the foregoing. The computer program code may be embodied in at least one computer-readable non-transitory medium which is accessible at least by the at least one processor 410 of the mobile terminal 110. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Figure 5:
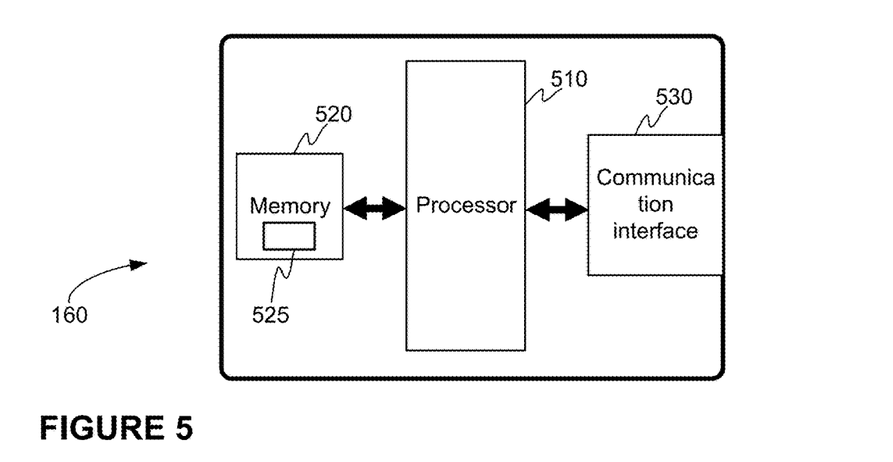
FIG. 5 illustrates schematically a network node according to an example of the present invention.

Some aspects of the present invention relate to a further network node 160 as illustrated schematically in FIG. 5. The further network node 160 comprises one or more processors 510, one or more memories 520 and one or more communication interfaces 530 which entities may be communicatively coupled to each other with e.g. a data bus. The communication interface 530 comprises necessary hardware for communication in wired or wireless manner with one or more communication network nodes residing in one or more communication networks. The communication network nodes may e.g. be registers or other network nodes including information in order to cause the network node 160 to function as described. The communication interface 530 may be at least partly controlled by the one or more processors 510 e.g. by executing portions of computer program code 525 stored in the one or more memories 520. The network node 160 may e.g. be a server communicatively coupled to one or more communication networks and in this manner to couple the network node 160 to the first and the second and any further networks.

The solution according to the present invention may be implemented in a mobile terminal 110 and a network node with a computer program that is configured to implement, when executed by a processing unit, the method steps as described. At the mobile terminal end the application software is advantageously provided with an access to a subscriber identity module, implemented in a smart card or by software, in order to perform the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for obtaining a communication service for a mobile terminal, the method comprising:
    monitoring at least one parameter representing an operational state of at least one service provided by a first communication network into which the mobile terminal is registered to with a first subscriber identity,
    in response to a detection that the at least one parameter does not fulfill at least one predetermined condition generating a signal to cause the mobile terminal to switch the first subscriber identity to a second subscriber identity, wherein the second subscriber identity allows the mobile terminal to register to a second communication network as a roaming subscriber,
    wherein the monitoring and the detection is performed by the mobile terminal by receiving a message from a network node collecting information on the operational state of the first communication network and by detecting, based on information carried in the message, if the at least one predetermined condition is fulfilled or not, and
    wherein the monitoring and the detection further comprising detection if the message is received under a predetermined schedule in the mobile terminal.

2. The method of claim 1, wherein the switch is performed by the mobile terminal in response to a detection that a message cannot be delivered to the first communication network by the mobile terminal.

3. The method of claim 1, the method further comprising delaying the generation of the signal for a period of time and performing the monitoring and detection during the period of time.

4. The method of claim 1, the method further comprising:
    switching the second subscriber identity to the first subscriber identity in response to an indication that at least one parameter representing an operational state of at least one service in the first communication network fulfills the at least one predetermined condition.

5. The method of claim 4, wherein the indication is received from at least one of the following: a network node maintaining information on the switched subscriber identities, from an analysis of received information by the mobile terminal.

6. A mobile terminal for obtaining a communication service, wherein the mobile terminal comprising:
    at least one processor;
    at least one memory including computer program code;
    the at least one memory and the computer program code configured to, with the at least one processor, cause the mobile terminal to perform:
    monitor at least one parameter representing an operational state of at least one service provided by a first communication network into which the mobile terminal is registered to with a first subscriber identity, in response to a detection that the at least one parameter does not fulfill at least one predetermined condition generate a signal to cause a switch of the first subscriber identity to a second subscriber identity, wherein the second subscriber identity allows the mobile terminal to register to a second communication network as a roaming subscriber, wherein the monitoring and the detection is performed by the mobile terminal by receiving a message from a network node collecting information on the operational state of the first communication network and by detecting, based on information carried in the message, if the at least one predetermined condition is fulfilled or not, and wherein the mobile terminal is further configured to detect if the message is received under a predetermined schedule in the mobile terminal.

7. The mobile terminal of claim 6, wherein the switch is performed by the mobile terminal in response to a detection that a message cannot be delivered to the first communication network by the mobile terminal.

8. The mobile terminal of claim 7, wherein the mobile terminal is further configured to delay the generation of the signal for a period of time and performing the monitoring and detection during the period of time.

9. The mobile terminal of claim 6, wherein the mobile terminal is further configured to delay the generation of the signal for a period of time and performing the monitoring and detection during the period of time.

10. The mobile terminal of claim 6, the mobile terminal is further configured to:
switch the second subscriber identity to the first subscriber identity in response to an indication that at least one parameter representing an operational state of at least one service in the first communication network fulfills the at least one predetermined condition.

11. The mobile terminal of claim 10, wherein the mobile terminal is configured to derive the indication on a basis of at least one of the following: information received from network node maintaining information on the switched subscriber identities, based on an analysis of received information by the mobile terminal.

12. A network node comprising:
at least one processor;
at least one memory including computer program code;
the at least one memory and the computer program code configured to, with the at least one processor, cause the network node to perform:
monitor at least one parameter representing an operational state of at least one service provided by at least one communication network,
maintain information on one or more switched subscriber identities, and
in response to a detection that the at least one parameter fulfills at least one predetermined condition set for a first communication network from which at least one subscriber identity is switched to another subscriber identity generate a signal comprising information for indicating that the first subscriber identity may be returned in order to cause the mobile terminal to register back to the first communication network,
wherein the monitoring and the detection is performed by the network node by receiving a message from a network node collecting information on the operational state of the first communication network and by detecting, based on information carried in the message, if the at least one predetermined condition is fulfilled or not, and
wherein the network node is further configured to detect if the message is received under a predetermined schedule in the mobile terminal.

13. A non-transitory computer-readable storage medium having computer-executable program code instructions stored therein for performing the method of claim 1 when the computer program product is executed on a computer.

* * * * *